(12) United States Patent
Prabhugaonkar et al.

(10) Patent No.: US 11,347,803 B2
(45) Date of Patent: May 31, 2022

(54) SYSTEMS AND METHODS FOR ADAPTIVE QUESTION ANSWERING

(71) Applicant: Cuddle Artificial Intelligence Private Limited, Mumbai (IN)

(72) Inventors: Neha Prabhugaonkar, Mumbai (IN); Abhay Parab, Mumbai (IN); Natwar Mall, Mumbai (IN)

(73) Assignee: Cuddle Artificial Intelligence Private Limited, Mumbai (IN)

( * ) Notice: Subject to any disclaimer, the term of this patent is extended or adjusted under 35 U.S.C. 154(b) by 0 days.

(21) Appl. No.: 16/752,868

(22) Filed: Jan. 27, 2020

(65) Prior Publication Data
US 2020/0279001 A1    Sep. 3, 2020

Related U.S. Application Data

(63) Continuation of application No. PCT/IB2019/053080, filed on Apr. 15, 2019, which is
(Continued)

(30) Foreign Application Priority Data

Mar. 1, 2019    (IN) .............................. 201921008186

(51) Int. Cl.
*G06F 16/9032*    (2019.01)
*G06N 20/00*    (2019.01)
(Continued)

(52) U.S. Cl.
CPC .. *G06F 16/90332* (2019.01); *G06F 16/24522* (2019.01); *G06F 40/284* (2020.01);
(Continued)

(58) Field of Classification Search
CPC .. G06N 20/00; G06N 3/049; G06F 16/90332; G06F 16/24522; G06F 40/284; G06F 40/295
See application file for complete search history.

(56) References Cited

U.S. PATENT DOCUMENTS 7,480,640 B1    1/2009 Elad
8,521,526 B1 *  8/2013 Lloyd .................... G10L 15/01
                                                        704/236
(Continued)

FOREIGN PATENT DOCUMENTS

EP    3534272        9/2019
WO    2007147166    12/2007

OTHER PUBLICATIONS

Chang et al., "SUTime: A Library for Recognizing and Normalizing Time Expressions," in Lrec 3735-40 (2012). (Year: 2012).*
(Continued)

*Primary Examiner* — Kamran Afshar
*Assistant Examiner* — Ryan C Vaughn
(74) *Attorney, Agent, or Firm* — Wiley Rein LLP

(57) ABSTRACT

Systems and methods for adaptive question answering are provided in which an answer is adaptive to a user's characteristics, goals and needs by continuously learning from user interactions and adapting both the context and data visualization. An exemplary system comprises software modules embodied on a computer network, and the software modules comprise an interpretation engine, an answering engine and a learning engine.

20 Claims, 7 Drawing Sheets

Related U.S. Application Data a continuation of application No. 16/383,934, filed on Apr. 15, 2019, now abandoned.

(51) Int. Cl.
*G06F 16/2452* (2019.01)
*G06F 40/284* (2020.01)
*G06F 40/295* (2020.01)
*G06N 3/04* (2006.01)

(52) U.S. Cl.
CPC ........... *G06F 40/295* (2020.01); *G06N 3/049* (2013.01); *G06N 20/00* (2019.01)

(56) References Cited

U.S. PATENT DOCUMENTS

| | | | |
|---|---|---|---|
| 10,747,823 B1* | 8/2020 | Birnbaum | ............... G06F 16/95 |
| 2002/0059069 A1 | 5/2002 | Hsu | |
| 2006/0112029 A1 | 5/2006 | Estes | |
| 2012/0117005 A1 | 5/2012 | Spivack | |
| 2013/0262501 A1 | 10/2013 | Kuchmann-Beauger | |
| 2015/0378716 A1* | 12/2015 | Singh | ..................... H04W 4/60 717/172 |
| 2016/0132787 A1 | 5/2016 | Drevo | |
| 2018/0101805 A1* | 4/2018 | Park | ...................... G06N 20/00 |
| 2018/0293221 A1* | 10/2018 | Finkelstein | ........... G06F 40/205 |
| 2018/0300173 A1* | 10/2018 | Shimamura | ........... G06F 9/5066 |
| 2018/0336183 A1 | 11/2018 | Lee | |
| 2019/0066660 A1* | 2/2019 | Liang | ..................... G06F 40/20 |
| 2019/0303473 A1 | 10/2019 | Sen | |
| 2019/0311220 A1* | 10/2019 | Hazard | ................ G06K 9/6226 |
| 2020/0074107 A1* | 3/2020 | Barbas | .............. G06F 16/24564 |

OTHER PUBLICATIONS

Wu et al., "The Exploration of Deterministic and Efficient Dependency Parsing," in Proc. 10th Conf. Computational Natural Language Learning 241-45 (2006). (Year: 2006).*

International Search Report issued in the corresponding PCT application Np. PCT/IB19/53080 dated Sep. 9, 2019.

Written Opinion of the International Search Authority issued in the corresponding PCT application Np. PCT/IB19/53080 dated Sep. 9, 2019.

European Search Report issued in the corresponding European application No. 19170464.2 dated Nov. 14, 2019.

European Search Report issued in the corresponding European application No. 20173643.6 dated Oct. 13, 2020.

* cited by examiner

SYSTEMS AND METHODS FOR ADAPTIVE QUESTION ANSWERING

RELATED APPLICATIONS

This application is a continuation-in-part of the U.S. patent application Ser. No. 16/383,934, filed Apr. 15, 2019, which claims priority benefit of International Patent Application No. PCT/IB2019/053080, filed Apr. 15, 2019, which claims priority benefit of Indian Patent Application No. 201921008186, filed Mar. 1, 2019, which are incorporated entirely by reference herein for all purposes.

FIELD

The invention relates to systems and methods in the field of computer science, including hardware and software, and artificial intelligence.

BACKGROUND ART

Data-driven decision-making situations, such as business intelligence, involve complex high-dimensional data sets. This often requires looking at various data sources, slicing them appropriately, examining results and discovering the most meaningful insights. Business users often spend disproportionate amounts of time on inefficient data busywork. They have very simple requirements, being able to ask business queries in most the natural way and get relevant business answers without worrying about the query language and other technical parts.

In most question answering systems, the output remains independent of the user's characteristics, goals and needs. Typically, these systems are static and rarely interact with the users and hence are incapable of learning and adapting answers based on the context of a question. Thus, there is a need for an adaptive learning system which adjusts its answers with respect to a user's characteristics, goals and needs.

SUMMARY OF THE INVENTION

The present disclosure provides systems and methods for adaptive question answering which are adaptive to a user's characteristics, goals and needs by continuously learning from user interactions and adapting both the context and data visualization, thereby improving quality and experience of the user. The present invention utilizes different natural language processing (NLP) approaches such as syntactic and semantic parsing for understanding and identifying the key entities and their relations in a question. The natural language interface allows a more natural flow of business queries for non-technical business users who don't need to face discomfort and difficulty while using technical terminology.

One exemplary embodiment of the invention herein provides a system for adaptive question answering comprising software modules executable by a computer network, and the software modules comprise an interpretation engine, an answering engine and a learning engine. The interpretation engine receives a question in natural language from a user and processes the question for holistic understanding of the user's question by incorporating semantic and usage knowledge from a learning engine. The question understanding is not restricted to the question text, but also identifies the user's intent, makes intelligent assumptions in the case of insufficiently elucidated questions, and performs disambiguation in case of ambiguities. The interpretation engine generates an interpretation which is passed to an answering engine for generation of relevant answer(s). An answering engine formulates various intermediate queries based on the interpretation and retrieves appropriate answers and metadata associated with the answers for an individual intermediate query. The answering engine determines a visualization preference by incorporating semantic and usage knowledge from the learning engine, and aggregates and ranks answers as appropriate. The answering engine also recommends follow-up or drilldown actions that a user can perform to aid a user in his information needs and further analysis. A learning engine augments, adapts and improves knowledge based on user interactions which are fed back to the learning engine. The user interactions comprise data inquiry, correction of ambiguous entities, actions on the interpretation, actions on the answer, tracking of the answer, drilling down on data, visualization changes, up-vote/down-vote on the answers, actions on a suggested analysis, and follow-up on suggested questions.

Another exemplary embodiment of the invention herein provides a system for adaptive question answering, comprising software modules executable by a computer network, wherein the computer network comprises a first subnetwork for data processing and a second subnetwork for data storage comprising usage knowledge; and the software modules comprise a first instruction to receive a question in natural language from a user;

a second instruction to identify, through three levels of parsers, a plurality of entities in the question, wherein the entities comprise periods, business objects, measures and conditions;

a third instruction to disambiguate lexical entities at a word level using word-sense disambiguation and entities at an entire context level of the question using rules for preposition;

a fourth instruction to validate a user's authorization for information retrieval through a fine-grained authorization control, wherein the fine-grained authorization control comprises a row level access, a column level access and a cell level access;

a fifth instruction to identify, by a machine-learning based parser, a user's intent through the usage knowledge, wherein the machine learning-based parser comprises a recurrent neural network and a logistic regression model;

a sixth instruction to generate an interpretation comprising period identification, business object identification, measure inference, condition identification, and intent identification;

a seventh instruction to formulate a plurality of intermediate queries based on the interpretation, wherein formulation of the intermediate queries comprises inferring a missing period through exploration and exploitation algorithms in reinforcement learning, merging business objects having common attributes, inferring measures for exploration intent, and validating the user's authorization;

an eighth instruction to convert each intermediate query into a database-aware structured query language query;

a ninth instruction to identify a transaction table for each database-aware structured query language query;

a tenth instruction to retrieve data values from the transaction table for each database-aware structured query language query;

an eleventh instruction to convert the data values to valid display formats to form an answer corresponding to each intermediate query;
a twelfth instruction to determine a visualization preference based on the usage knowledge;
a thirteenth instruction to recommend follow-up or drill-down actions to aid the user in his information needs and further analysis; and
a fourteenth instruction to aggregate and rank the answers.

Another exemplary embodiment of the invention herein provides a method for adaptive question answering, comprising steps of
receiving, by an adaptive question answering system implemented by a computer network, a question in natural language from a user, wherein the computer network comprises a first subnetwork for data processing and a second subnetwork for data storage comprising usage knowledge;
identifying, through three levels of parsers, a plurality of entities in the question, wherein the entities comprise periods, business objects, measures and conditions;
disambiguating lexical entities at a word level using word-sense disambiguation and entities at an entire context level of the question using rules for preposition;
validating a user's authorization for information retrieval through a fine-grained authorization control, wherein the fine-grained authorization control comprises a row level access, a column level access and a cell level access;
identifying, by a machine-learning based parser, a user's intent through the usage knowledge, wherein the machine learning-based parser comprises a recurrent neural network and a logistic regression model;
generating an interpretation comprising period identification, business object identification, measure inference, condition identification, and intent identification;
formulating a plurality of intermediate queries based on the interpretation, wherein formulation of the intermediate queries comprises inferring a missing period through exploration and exploitation algorithms in reinforcement learning, merging business objects having common attributes, inferring measures for exploration intent, and validating the user's authorization;
converting each intermediate query into a database-aware structured query language query;
identifying a transaction table for each database-aware structured query language query;
retrieving data values from the transaction table for each database-aware structured query language query;
converting the data values to valid display formats to form an answer corresponding to each intermediate query;
determining a visualization preference based on the usage knowledge;
recommending follow-up or drilldown actions to aid the user in his information needs and further analysis; and
aggregating and ranking the answers.

BRIEF DESCRIPTION OF THE DRAWINGS

The invention will be described in more detail below based on drawings, which illustrate exemplary embodiments. In the drawings, in each case schematically.

DETAILED DESCRIPTION OF THE EMBODIMENTS

It should be understood that this invention is not limited to the particular methodology, protocols, and systems, etc., described herein and as such may vary. The terminology used herein is for the purpose of describing particular embodiments only, and is not intended to limit the scope of the present invention, which is defined solely by the claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

"Reinforcement learning (RL)" is an area of machine learning concerned with how software agents ought to take actions in an environment in order to maximize some notion of cumulative reward. Reinforcement learning is one of three basic machine learning paradigms, alongside supervised learning and unsupervised learning.

"Structured Query Language (SQL)" is a domain-specific language used in programming and designed for managing data held in a relational database management system (RDBMS), or for stream processing in a relational data stream management system (RDSMS). It is particularly useful in handling structured data, i.e. data incorporating relations among entities and variables.

"Data value" refers to a value that derives from processing the data using different analytics that contribute to problem solving.

"Drilldown" is the act of focusing in. The term is sometimes used when referring to moving down through a hierarchy of folders and files in a file system. It may also mean clicking through a series of dropdown menus in a graphical user interface.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments.

One exemplary system embodiment herein provides an adaptive question answering engine system comprising software modules embodied on a computer network, and the software modules comprise an interpretation engine, an answering engine and a learning engine.

Figure 1:
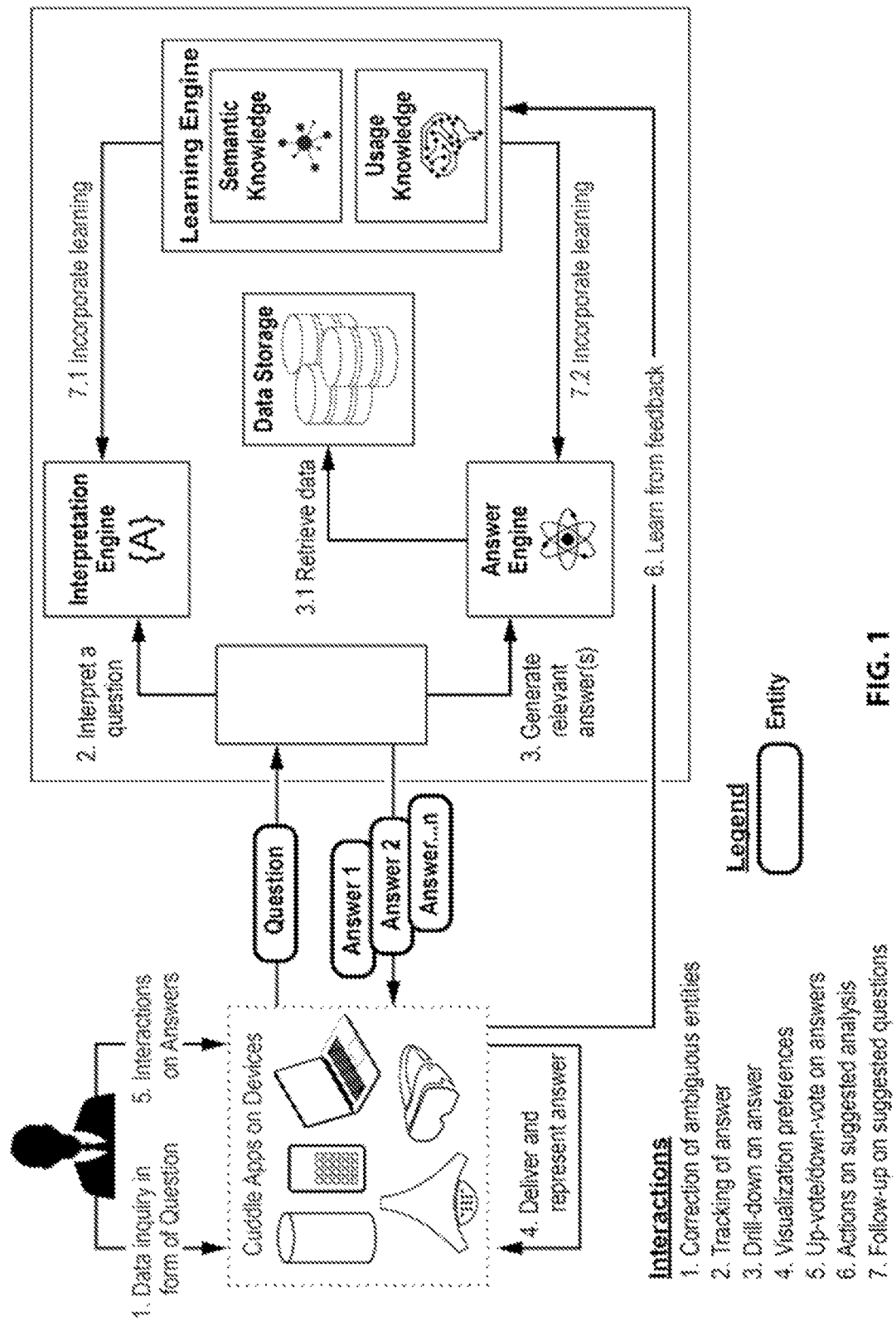
FIG. 1 shows the workflow of the system.

FIG. 1 details the overall workflow of the system. A user can interact with the system in natural language using any system of interaction, such as mobile applications, desktop applications, web applications, voice-based hardware, etc. The input from the user to the present system is captured as a question. The question is further processed by the interpretation engine of the system. The interpretation engine incorporates organization and usage knowledge for holistic understanding of the user's question. The question understanding is not restricted to the question text, but also identifies the user's intent, makes intelligent assumptions in the case of insufficiently elucidated questions, performs disambiguation in the case of ambiguities, and so on. The semantic understanding of the question context is termed as interpretation.

Interpretation is further passed to an answering engine for generation of relevant answer(s). The answering engine is also responsible for determining which data source(s), and which slice of data, the user might be interested in. It also retrieves data from an underlying data cluster, determines a visualization preference based on past interactions, and builds on additional contexts as deemed fit. To aid the user in his information needs and further analysis, the answering engine also recommends follow-up actions that the user can perform.

All of these answers are presented to the user on a system of interaction in an appropriate manner, providing an opportunity for the user to interact with the system. All user interactions are fed back to a learning engine. User interactions can be correction of assumptions made while answering a question, choosing an alternative visualisation, or even simple feedback like upvote or downvote on an answer. The system adapts from these interactions, thereby enriching the usage knowledge as well as semantic knowledge.

Figure 2:
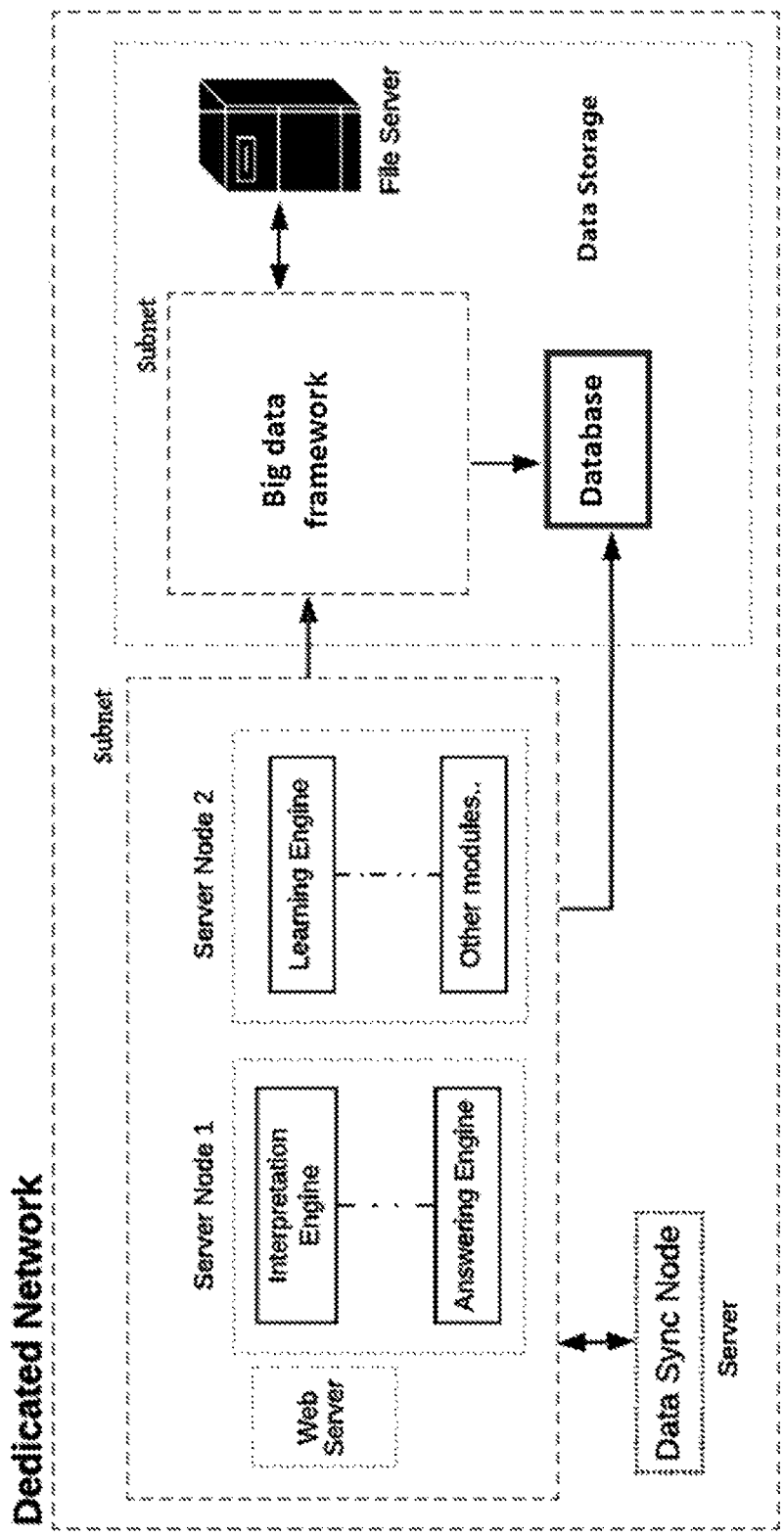
FIG. 2 depicts the computer network of the system.

FIG. 2 depicts the exemplary computer network of the system. The computer network for the adaptive question answering system comprises a first subnetwork for data processing and a second subnetwork for data storage. The first subnetwork for data processing comprises a multi-server node cluster which may run on a Kubernetes® containers cluster orchestration system. The multi-sever node cluster comprises a first one server node running the interpretation engine and the answering engine, and a second server node running the learning engine and other software modules. The second subnetwork for data storage comprises a big data framework for data inquiry and retrieval. The big data framework may be powered by Apache Spark®. Apache Spark® is an open-source distributed general-purpose cluster-computing framework for processing and analyzing a large amount of data. Both subnetworks are connected to a database system. The database system may be powered by PostgreSQL®, a free and open-source relational database management system emphasizing extensibility and technical standards compliance.

Another embodiment for the first subnetwork for data processing comprises at least one virtual or physical server node for implementing an interpretation engine, an answering engine, a learning engine, data synchronization or other modules. A further embodiment for the first subnetwork for data processing provides serverless architectures. Serverless architectures are application designs that incorporate a third party mobile backend as a service (MBaaS), also known as "backend as a service", a model for providing a way to link applications to backend cloud storage and application programming interfaces (APIs) exposed by back end applications while also providing features such as user management, push notifications, and integration with social networking services. Serverless architectures may include custom codes run in managed, ephemeral containers on a "functions as a service" (FaaS) platform. FaaS is a category of cloud computing services that provides a platform allowing customers to develop, run, and manage application functionalities without the complexity of building and maintaining the infrastructure typically associated with developing and launching an app. Serverless architectures remove much of the need for a traditional always-on server component and may benefit from significantly reduced operational costs, complexity, and engineering lead time.

As mentioned above, the present system comprises software modules embodied on a computer network, and the software modules comprise an interpretation engine, an answering engine and a learning engine. Details of each software module are disclosed below.

Figure 3:
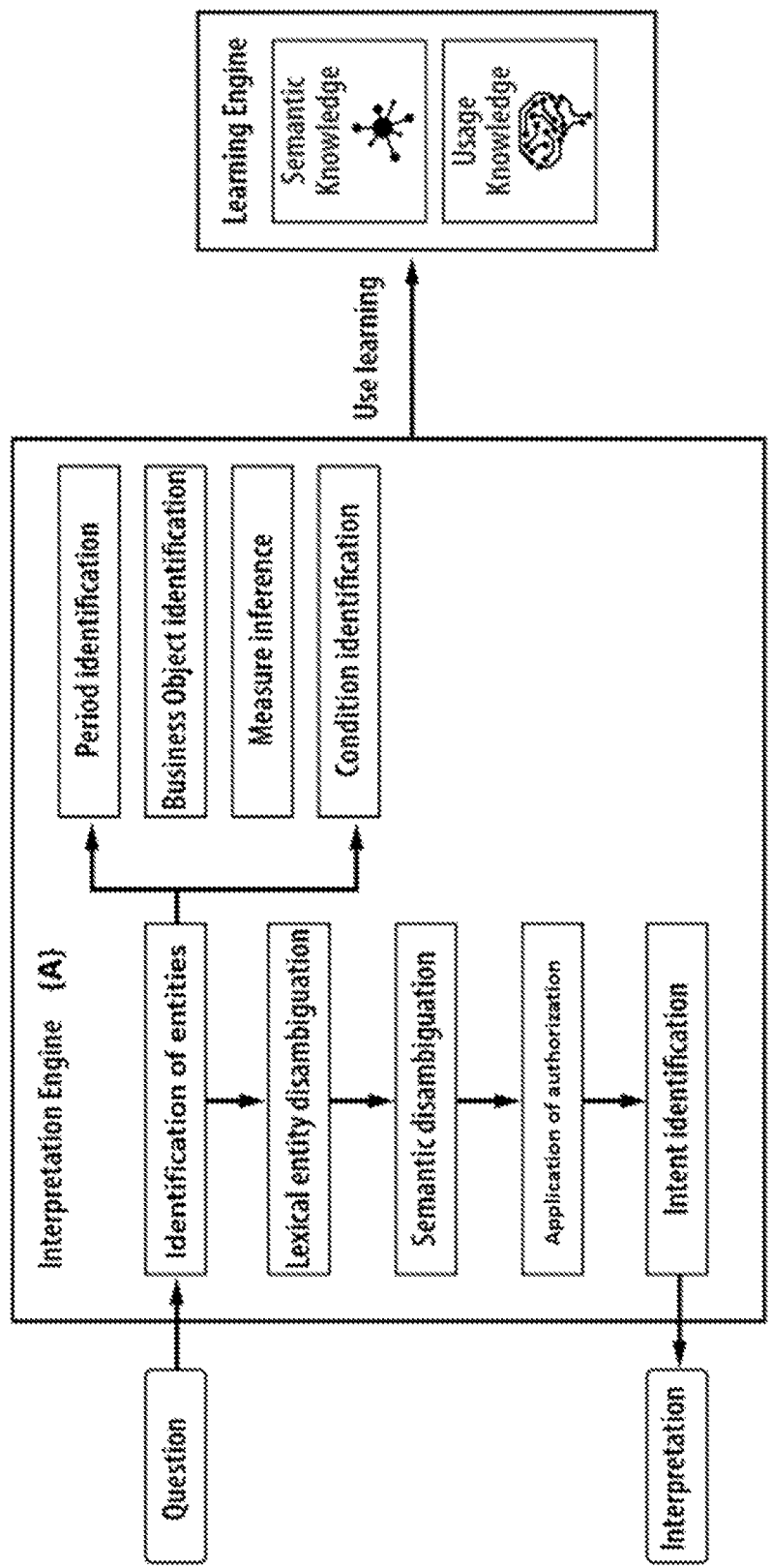
FIG. 3 depicts the details of the interpretation engine.

FIG. 3 depicts an exemplary workflow of the interpretation engine. The role of the interpretation engine is to convert a user's question into an intermediate structured representation called an interpretation. The interpretation essentially captures the key entities from the question after analysing and understanding the context of the question. A combination of overlap-based word sense disambiguation approaches and Bayesian algorithms is used for entity disambiguation and ranking. Reinforcement learning, especially exploration and exploitation, are used to learn from a user continuously at the user-level as well as organization-level. The output of the interpretation engine is an interpretation, which is essentially a form with placeholders for the types of concepts that make up the formal query. The types of these concepts may include, but are not limited to, measures, attributes (dimensions), business objects, filters on attributes, limits, temporals, date ranges, user's intent, etc.

In the step of identification of entities, the interpretation engine uses a semantic-parser algorithm to parse the question and identify the named entities including key constituent phrases and tokens from the question. The examples of named entities can be person or organization names, locations, dates and times. The named entities can then be organized under predefined categories, such as "periods"—relative, specific & periodic, "business objects"-column values, "measures"—numerical columns, "filters & conditions", and other important features from question and user context.

In a business domain, the named entities have a very specific meaning and connotation specific to that domain. For example, the named entities can be brand names (MULLIGAN®, WINKLE®), sub-brand names (MULLIGAN®-Dark, WINKLE®-Light) or location names (New York, Dallas).

Named entity identification plays a pivotal role in the interpretation engine. The ability to serve accurate answers by the present invention relies heavily on the quality of the named entity recognition performed on the user question. Missing a single named entity from the question may result in an incorrect or incomplete interpretation which will subsequently lead to an incorrect answer. The key challenges in entity extraction are that entities will not be marked appropriately and that they may span multiple words. To meet these challenges, the present invention applies three levels of parse-based approaches to extract entities in the question.

The first level of parsing is based on a constituency parser. Constituency parsing aims to extract a constituency-based parse tree from a sentence that represents its syntactic structure according to a phrase structure grammar. Syntactic parsing is the task of recognizing a sentence and assigning a syntactic structure to it. The system uses constituency parser powered by Stanford CoreNLP, a JAVA® annotation pipeline framework to parse a user question. See Manning, Christopher D., et al., *The Stanford CoreNLP Natural Language Processing Toolkit*, In Proceedings of the 52nd Annual Meeting of the Association for Computational Linguistics: System Demonstrations, pp. 55-60, 2014. Stanford CoreNLP provides most of the common core natural language processing (NLP) steps, from tokenization through to coreference resolution. A constituency parse tree breaks a text into sub-phrases. The constituency parse tree distinguishes between terminal and non-terminal nodes according to a phrase structure grammar. The interior nodes are labeled by non-terminal categories of the grammar, while the leaf nodes are labeled by terminal categories. Non-terminals in the tree are various types of phrases (noun phrase, verb phrase, etc.), the terminals are the words in the sentence, and the edges are dependency links between terminals or non-terminals. To identify the entities, the non-terminals and terminals of the parse tree are searched in the knowledge base and the following entities are identified:

Attributes [A1 ... Ak]
Business Objects [BO1 ... BO1]
Measures [M1 ... Mm] for each phrase or sub-question The entities are searched by using various NLP techniques, such as stemming, lemmatization, string edit distance, semantic similarity, and Jaccard similarity, for searching entities in the knowledge.

The second level of parsing based on stop words is applied to complex questions, especially business-related questions. Stop words herein refer to extremely common words such as a, an, and, are, as, with, etc. The conventional parsing technique may drop these common terms as they are of little value in understanding the whole text. However, this invention may rely on these stop words to identify the entity boundary. In a business setting, entities are often complex and rare, including, for example, complex entity names, overlapping entities, ambiguous entities, overly long entity names, etc. Identification of these entities from natural language text is even more challenging. The pre-trained parsers sometimes fail to identify the entity boundary and type correctly and therefore result in incorrect interpretation. Therefore, a second level of parsing based on stop words is used to identify the boundaries of the sub-phrases from the questions using stop words and later these sub-phrases are searched in the usage knowledge for the identification of the above-mentioned entities.

Once the above mentioned two levels of parsing are performed, the third level of parsing applies relaxation techniques to identify unresolved tokens in the question by relaxing an algorithmic constraint. This results in additional entities being identified. The system then chooses intelligently which of these additional results are to be considered using text matching algorithms such as string edit distance and semantic similarity approaches and intelligently selects the entities relevant for that context.

Periods in a question are identified using Stanford SUTime, a temporal tagger that extracts temporal expressions and normalizes them. SUTime is a library for recognizing and normalizing time expressions. For example, SUTime will convert next Wednesday at 3 pm to something like 2016-02-17T15:00 (depending on the assumed current reference time). SUTime is available as part of the Stanford CoreNLP pipeline and can be used to annotate documents with temporal information. See Angel X. Chang and Christopher D. Manning, *SUTIME: A Library for Recognizing and Normalizing Time Expressions,* 8th International Conference on Language Resources and Evaluation (LREC 2012). SUTime is a deterministic rule-based system designed for extensibility. In the absence of any temporal expression in the question, the system makes intelligent inference of the period based on the context of the question and past user interactions with the system.

Questions like "Sales yesterday" or "Sales on the first Friday of third week for last month" are perfect examples of time-periods that are easy for humans to understand but hard for machines. In a natural language question, time-period is often complicated or completely missed. While enterprise data are commonly available with a timestamp, deciphering the time-period or time interval in a free-text question is challenging. The system can understand a wide range of temporals from questions such as:

Specific temporals (June $10^{th}$, June 2019, etc.),
Relative temporals (this month, last year, last quarter, etc.),
Periodicity temporals such as daily, monthly, weekly, yearly,
Time ranges (June to September, Jan. 19, 2001 to Jan. 5, 2019, etc.).

To answer any question, identification of time periods is very critical. A user can ask a question specifying an explicit or implicit period. It is also possible that a user can ask questions without specifying any temporals in a question. Period identification involves two steps. The first step is to identify periods from the question and the second step is the resolution of identified periods into a format that the system can understand.

Measures are identified and ranked using Bayesian learning and a weighted context similarity approach. In Bayesian learning, the learning system updates its prior probability of models (explanations, states of the world, etc.) into posterior probability according to Bayes' rule. The updated probability can then be used for prediction or making decisions. In both cases, the computation involves a sum weighted by the posterior probability (or an integral in the case of real valued parameters). For example, in a question—"Sales of Region East for this month", "Sale" is polysemous in a business setting and may refers to "total unit sales" or "total dollar sales". In such a scenario, the present system may infer 'Sales' to be associated with "total dollar sales" based on usage knowledge and question context.

The algorithm for identification of measures is as follows:
Input: Qsd, [A]
Output: List of Measures, [M]
1. Get candidate measures, [MCANDIDATES]—Get the applicable measures from knowledge considering the context of the question; the context is provided, mainly by the entities, mainly attributes and business-objects involved in the question.
2. Check for exact measure match
   2.1. If TRUE, return M
   2.2. Else, perform 3
3. ∀ [M], compute score, S
   3.1. Compute context similarity score using weighted Jaccard Similarity using question context and measure context from knowledge which includes measure name, description and glossary.
   3.2. Compute usage score using Bayesian inference from usage knowledge
   3.3. Add 3.1 and 3.2 to get score, S
4. Rank measures [M] based on score, S Identification of conditions and application of conditions on a measure is a challenging problem. Business users often need to ask such complex conditional questions (less-than, less-than-equal-to, greater-than, etc.) to analyze their business performance. For example, which retailers have more than 95% distribution but less than 98% in April 2018? The system can extract conditional information from a natural language question and apply those conditions on the requested measure. The system understands the conditions and values considering the context of the question and converts them to normalized values. To identify conditions from the question, a forward-backward parsing algorithm is used. See Jason M. Eisner, *Inside-Outside and Forward-Backward Algorithms are just Backprop*, In Proceedings of Structured Prediction Workshop at EMNLP, 2016.

The next step after entity identification is the disambiguation of lexical entities. Word-sense disambiguation (WSD) is used to determine the correct meaning of an ambiguous word in each context. WSD is an open problem concerned with identifying which sense of a word is used in a sentence. In natural language text, words can be polysemous (word having more than one sense) in nature. In a business context, measures and business objects can be often polysemous in nature. In such cases, the context and usage knowledge are used to disambiguate the entities. The measures are disambiguated and ranked using an inferencing algorithm and a weighted context similarity approach. For example, in a question—"Sales of Region East for this month", the word "Sales" have more than two senses ("Total Unit Sales", "Total Dollar Sales"). In such a scenario, according to the usage knowledge and question context, 'Sales' could be associated with "Total Dollar Sales".

Once the system disambiguates ambiguous entities, the next step is semantic disambiguation. While lexical disambiguation is all about disambiguating entities at the word level, semantic disambiguation deals with disambiguation of entities considering the entire context of the question. This involves disambiguating entities considering the data source information of measures and with respect to the other entities in the question. Once all the measures and business objects are disambiguated, appropriate filters and conditions are applied on the measure entities. The present system applies various natural language constructions for disambiguating the entities and their types, for example:

Example 1: sales vs target for west, here target is a measure

Example 2: sales target in west, here sales target is a measure

Example 3: sales by target for west, here target is an attribute

Example 4: sales in target for west, here target is business object (retailer)

The present system uses rules for preposition to disambiguate entities of same entity type. In example 1, "sales" is an entity of type measure; "target" is an entity of type measure and attribute.

In the example—"Sales in City New York and Dallas," New York is a business object which can refer to a city or state. Since the user has explicitly mentioned "city New York", New York is disambiguated as city and not state. The present system understands the context of the entire question rather than just the words adjacent to it.

The present system uses a forward and backward parsing approach to store all the information associated with the entity (grammatical category, entity label, entity type, transactional information, etc.) and later disambiguates and validates the entities as a whole rather at the entity level, which distinguishes the present system from currently available question answering systems.

Enterprise application without access control is a no-go for almost all (if not all) organizations. Access control plays a considerable role in ensuring that a user gets access to only authorized information. It is critical to establish who is authorized to access what data. To ensure that only those with the proper authorizations can view sensitive company data, the present system allows administrators to stringently control who has access to which business areas and KPIs and only produces the answers that the user is authorized for. The present system supports fine-grained authorization control at the row, column or cell levels. The interpretation engine is responsible for ensuring that a user gets access to only authorized information. Here, the measures identified from the question are checked through the usage knowledge in the learning engine to determine whether the user is authorized for them or not.

The last step in the interpretation engine is to identify the user's intent which can be further utilized by an answering engine. An important attribute of a smart business system is the ability to understand and interpret context and intention of a question. The present system understands the true intention of a question in both linguistic and analytical contexts.

The present system uses a machine learning-based parser to derive user intents. The machine learning-based parser may use an ensemble of two techniques to derive an intent from the text received from a user: (1) a recurrent neural network (RNN) architecture in the form of a long short-term memory (LSTM) network, and (2) a logistic regression model. In some examples, a graph long short-term memory (graph LSTM) neural network may be utilized to extract from received text semantic meanings and relationships between words that are inherent to natural language.

In some examples, the machine-learning parser may receive and process text to graph nodes (e.g., words, phrases, characters, etc.) and edges (e.g., dependency links between nodes) in individual phrases and across boundaries of phrases. In various examples, the graphing may include identifying one or more links (e.g., syntactic, semantic, co-reference, discourse, etc.) between nodes in the text. The links can include intra-phrase and inter-phrase links between nodes. For example, a link can represent a relationship between the root of one phrase and the root of an adjacent phrase. For another example, a link can represent a relationship between two words in a phrase.

In some examples, one or more machine learning-based parsers may be trained and utilized to determine a user's intent from the user's input and usage knowledge. A training set of the machine learning-based parser(s) may be enhanced by receiving user intents derived by a rules-based parser or another machine learning-based parser.

All these above identified key elements (business entities, period, filters, conditions, intent) form the interpretation.

Figure 4:
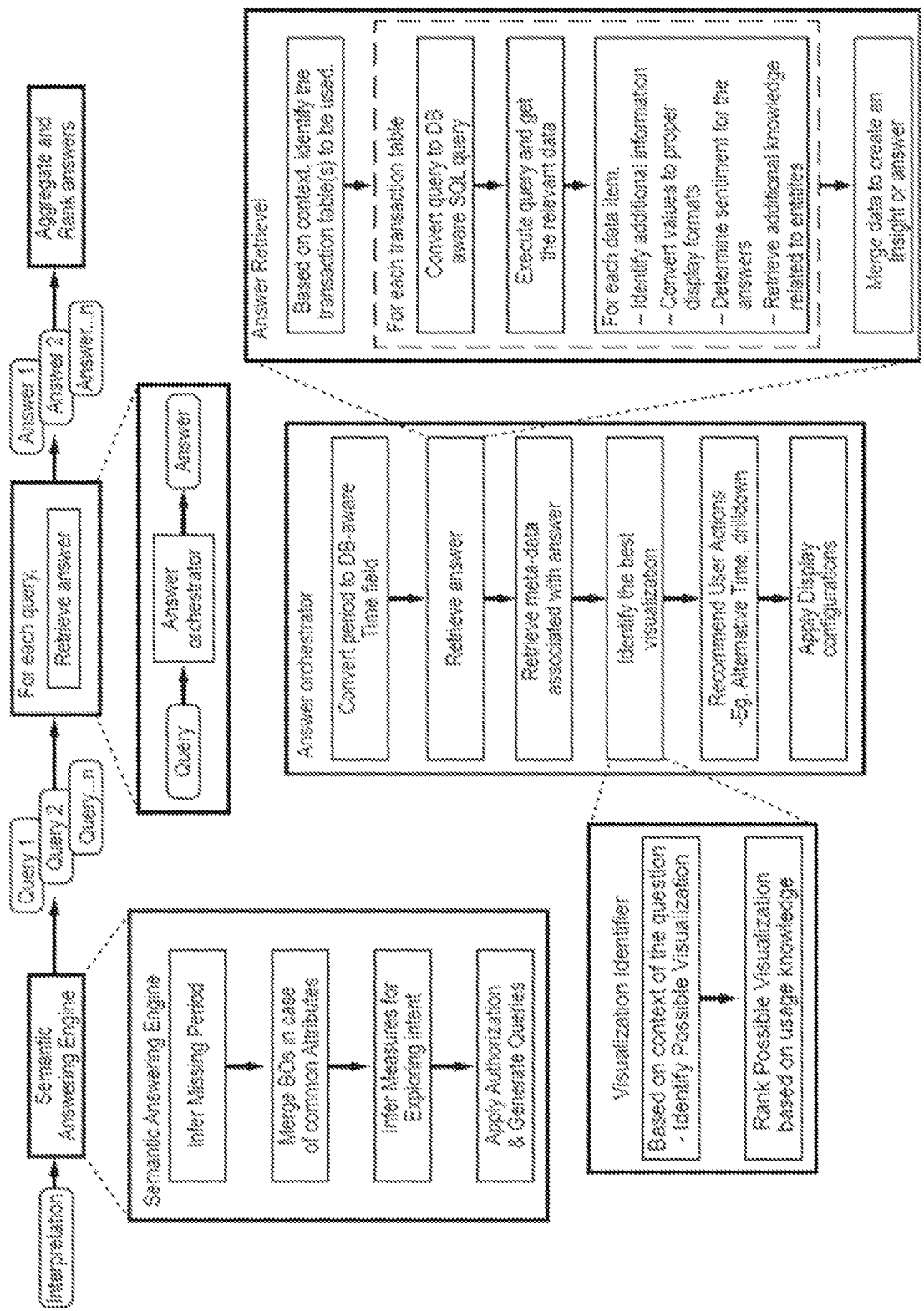
FIG. 4 depicts the details of the answering engine

FIG. 4 illustrates an exemplary workflow of the answering engine. The main task of the answering engine is to generate appropriate answer(s) based on the semantic interpretation deduced from the question.

The answering engine consists of two critical sub-engines—a semantic answering engine (SAE) and an answer orchestrator (AO). SAE is responsible for determining queries based on a given interpretation and ranking the same and AO is responsible for determination of answers for a given query.

To answer any business question, it is important to have a time period. Period can be explicitly or implicitly specified by the user. In scenarios where no period is mentioned in the question, the answering engine infers the period considering the context of the question and usage knowledge. Exploration and exploitation algorithms in reinforcement learning are used to infer the period.

Once the missing period is inferred, business objects having common attributes are merged. Further, different entities are grouped together based on a set of parameters such as entity types and identified filters. If the question is exploratory in nature, the answering engine identifies which are the key measures relevant to the user based on user's past interactions with the system. The system continuously learns about the user based on the user's interaction with the system. Reinforcement learning is used for inferencing and ranking different aspects while answering the question.

The answering engine is also responsible for ensuring that the user has access to only authorized information. The answering engine validates the user's authorization to retrieve the measures, attributes and business-objects and filters the results based on the authorization. Once the authorized entities are identified, the answering engine will group multiple possible measures based on effective permissions. The answering engine then formulates a set of intermediate queries required to answer the question. The number of the intermediate queries can range from one to many depending upon the intent of the question. The answers are equivalent to the queries formed.

As the next step, the answering engine consults the enterprise data to obtain an appropriate answer and metadata associated with the answer for an individual intermediate query. The answer orchestrator (AO) takes each query as an input and generates an answer. The answer orchestrator also converts the period entity from individual query into a database (DB)-aware time field.

Based on the measures, attribute and business objects, the answer retrieval module identifies the transaction table which needs to be queried. The query is later converted into a DB-aware Structured query language (SQL) query. The answer retrieval module then executes the query and retrieves relevant data values for answering the question. The data values are later converted to valid display formats so that the consumption of values becomes easier for the user. Also, the answer retrieval module determines the sentiment associated with the values and retrieves the additional information associated with the entities in the question.

The answering engine also understands the user question using the interpretation and automatically determines the best visualization—the best way to represent the information presented to the user based on data type, data size, dimensions, patterns and intent of the question asked along with alternate visualizations supported for the answer(s). The available visualizations for representing the information are ranked based on the usage history and user's past visualization preferences.

The system helps improve the ability to understand the hidden information in a more constructive way. The system allows the user to easily drill down into the data to explore multidimensional data by navigating from one level down to a more detailed level. Drilldown allows users to retrieve aggregated, summary data and then hierarchically explore deeper levels of the data for more specific analysis. A given answer may trigger the next set of questions that user might ask. The system recommends follow-up actions for easy discovery and effective analysis. As a last step, the user is served with assembled and ranked answer(s) for the question asked.

Figure 5:
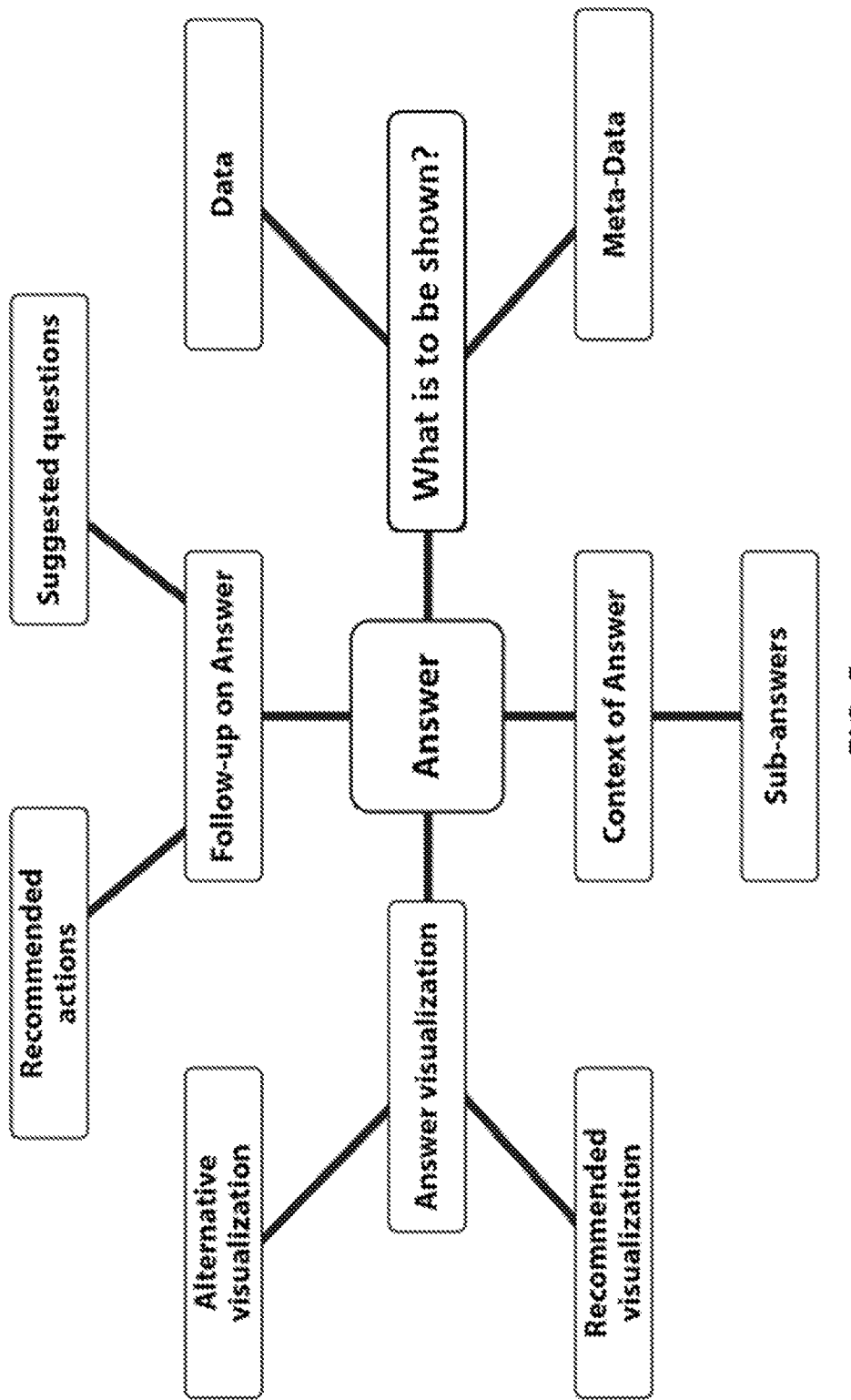
FIG. 5 shows an exemplary representation of what constitutes an answer in the system
FIG. 6 details the building blocks of Analytics specific Meta Ontology (AMO).

FIG. 5 illustrates an exemplary representation of what constitutes an answer in the system.

A machine learning-based learning engine gathers and governs the knowledge in the system. The learning engine has two types of knowledge including semantic knowledge and usage knowledge.

The learning engine applies ontology-based semantic technologies to analyse a question. An ontology is a controlled vocabulary that describes objects and the relations between them in a formal way and has a grammar for using the vocabulary terms to express something meaningful within a specified domain of interest. The vocabulary is used to make queries and assertions. An ontology can be implemented as a data model that represents a set of concepts within a domain and the relationships between those concepts. It is used to reason about the objects within that domain and to provide knowledge representation about the world or some part of it. Ontologies generally describe an individual or basic objects; classes or set, collections, or types of objects; attributes or properties, features, characteristics, or parameters that objects can have and share; relations or ways that objects can be related to one another; and events: the changing of attributes or relations.

Figure 6:
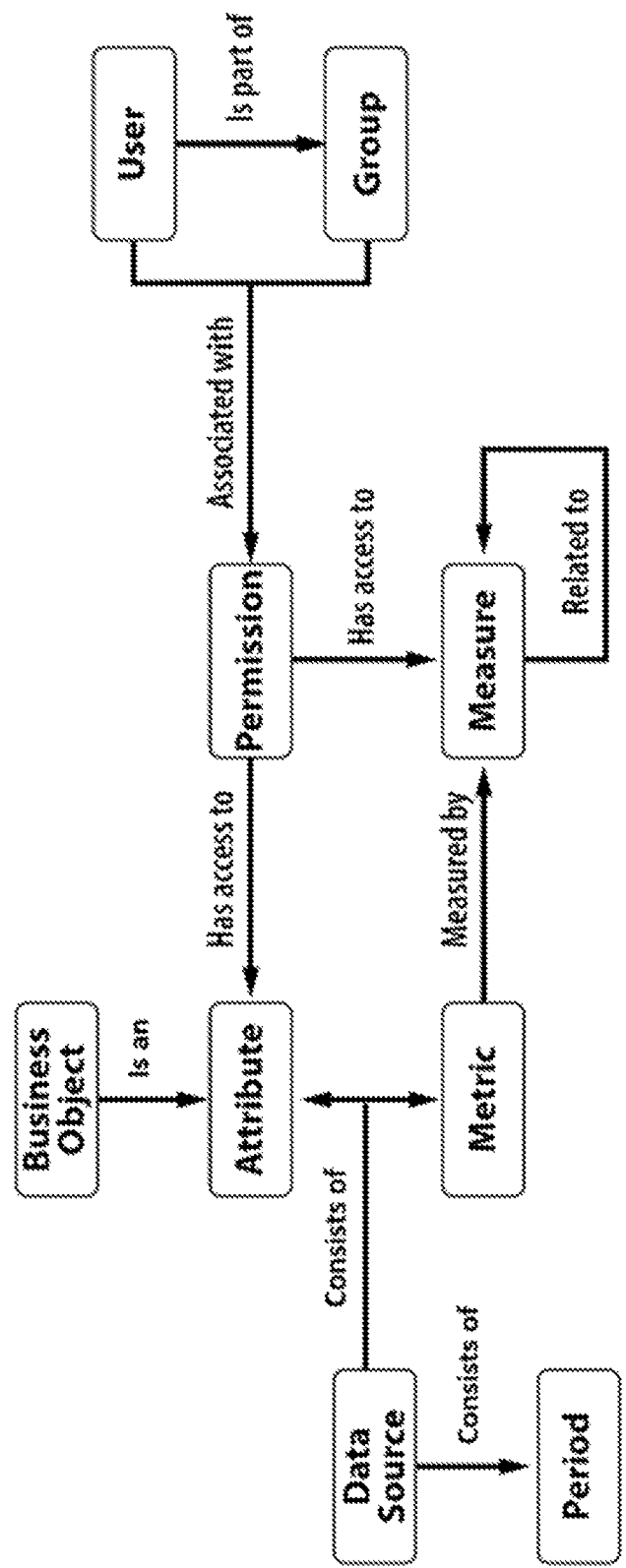

Several efforts have been made in the creation of meta-ontologies, but they were unsuccessful in catering to the analytics need. This invention solves this problem by building an Analytics specific Meta Ontology (AMO). FIG. 6 details building blocks of an AMO. A concept map is generated by automatically creating high-level entities/concepts as a keyword list through applying natural language processing, including word dependency and POS tagging. Then this list can be used to extract entities/concepts for the same domain. Each concept has properties such as name, label, glossary, synonym and other relevant properties. This invention captures this understanding of domain and organization specific knowledge in semantic knowledge. Semantic knowledge is considered as organization specific ontology derived from AMO. For example, 'Brand' is an attribute, 'Colgate®' is an entity of type Brand, and 'Total Number of Units' is a measure with a glossary as "total numbers of items being sold".

Figure 7:
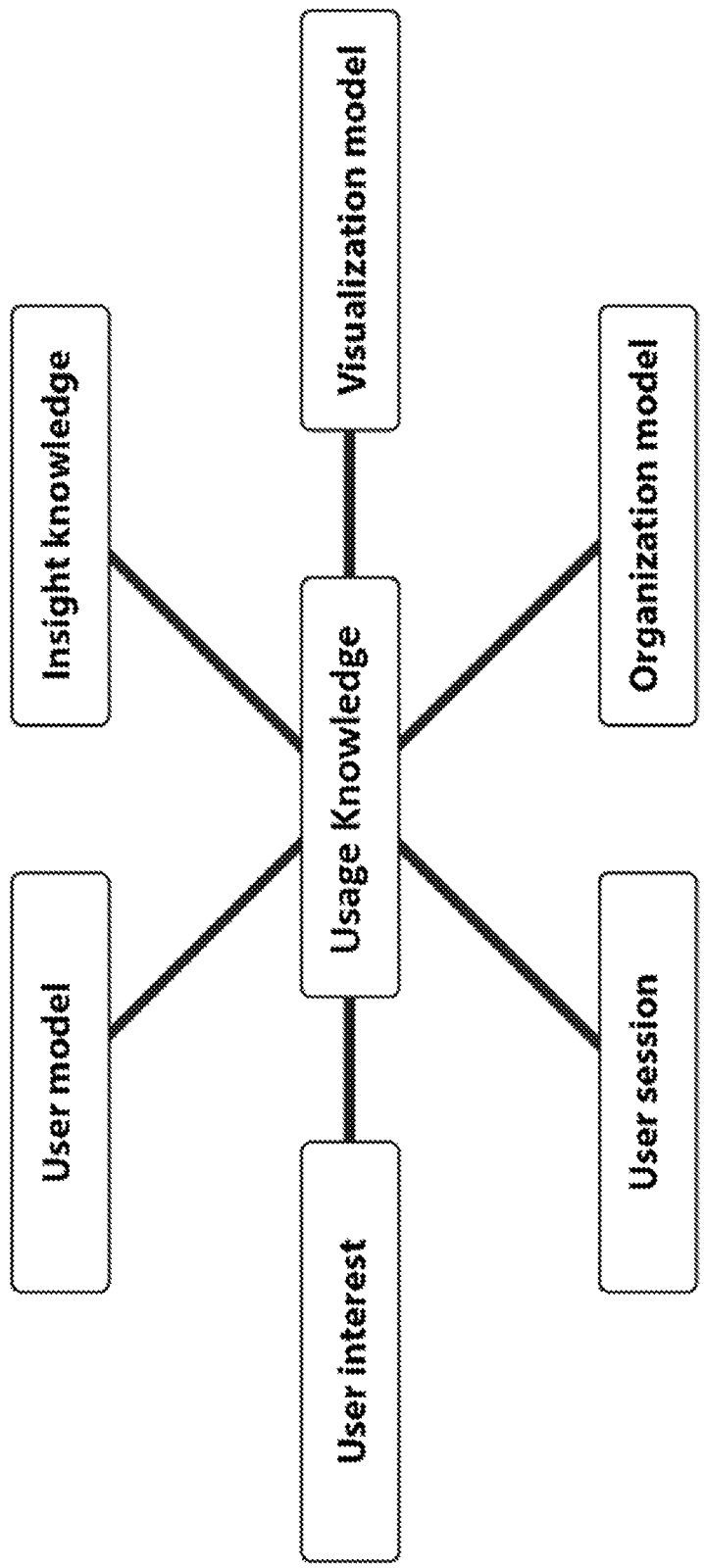
FIG. 7 details high level usage knowledge captured from various user/system interactions.

FIG. 7 illustrates exemplary usage knowledge captured from various user/system interactions. A user model captures all the user-specific interactions, such as feedback being provided by the user on answers, corrections of assumed entities, etc. While an organization model captures meta information across the organization based on similar feedback, a visualization model captures the user's visualization preferences for a given insight. Insight knowledge is a repository of all the insights which were served to users and links to AMO for all valid contexts. A user session keeps track of what users are performing by monitoring interactive information interchanged between the user and the system. The system builds up user specific interest from every user interaction.

The user interactions comprise data inquiry, correction of ambiguous entities, actions on the interpretation, actions on an answer, tracking of the answer, drilling down on data, visualization changes, up-vote/down-vote on the answers, actions on a suggested analysis, and follow-up on suggested questions.

The first interaction starts with user asking a question in natural language. The learning engine learns the context for a given user at a given time building a user session. This user session along with recent questions plays a considerable role in understanding the user's intent.

As detailed earlier, entities can be ambiguous in nature and in such cases the system makes intelligent assumptions in disambiguating entities based on the context and usage knowledge. Correction of ambiguous entities provides an opportunity for the learning engine to enrich its knowledge, thereby improving the entity disambiguation for subsequent data enquiries (for all the users in an organization).

In the case of incomplete questions, the system infers necessary & mandatory entities (e.g. measures) using the knowledge and context for generation of answers. The system allows the user to change this context. This interaction is considered as feedback for subsequent data inquiries (for all the users in an organization).

The system considers period entities as a special case and allows a user to change the same when an answer is being served. This allows the user to explore data with respect to different time frames. The learning engine learns a relevant time period for a given context from this interaction. The knowledge will be later used by the system to infer time periods in the case of incomplete questions (for all the users in an organization).

Answers can be tracked/untracked based on the user's changing business preferences. The learning engine captures the user's interest from these interactions. This knowledge helps the system better rank the answers as well as disambiguate entities.

Users typically have a need to drill down on data for better understanding of business. Drill down is a capability that takes the user from a more general view of the data to a more specific one at the click of a mouse. For example, an answer that shows sales revenue by state can allow the user to drill down and retrieve sales revenue by county or city within that state. It is called "drill down" because it is a feature that allows the user to go deeper into more specific layers of the data or information being analysed. The system enables the same and learns the user's interest areas. Also, these interactions allow the system to predict and pre-empt follow-up questions that users might have, thereby improving suggested analysis based on answers.

A change in visualization helps the system understand what the preferred visualization is for a given answer. This helps the system learn & recommend the best visualization for subsequent answers (for all the users in an organization) in the case of a data enquiry.

The system allows a user to provide feedback on relevancy and validity of an answer using up-vote/down-vote actions. This helps the system to learn and adapt a user model, thereby improving experience with subsequent data enquiries (for all the users in an organization).

The system pre-empts follow-up questions that the user might have when presented with an answer by recommending related analysis. For example, "benchmark across all the region" might be recommended for the answer, "sales of West region in 2018". Invocation or non-invocation of these recommended analyses along with the context allows the learning engine to learn about the user's way of interaction with the data, giving an opportunity to improve the same.

The system recommends suggested questions to the user, when the data are not available for a given context. This recommendation is based on the usage knowledge.

The learning engine augments usage knowledge based on user interactions. The learning engine improves knowledge based on each user interaction to make the system smarter.

The invention claimed is:

1. A system for adaptive question answering comprising software modules and a computer network, wherein
   the computer network comprises a first subnetwork for data processing and a second subnetwork for data storage comprising usage knowledge; and
   the software modules comprise
   a first instruction to receive a question in natural language from a user;
   a second instruction to identify, through three levels of parsers, a plurality of entities in the question, wherein the entities comprise periods, business objects, measures and conditions;
   a third instruction to disambiguate lexical entities at a word level using word-sense disambiguation and entities at an entire context level of the question using rules for preposition;
   a fourth instruction to validate a user's authorization for information retrieval through a fine-grained authorization control, wherein the fine-grained authorization control comprises a row level access, a column level access and a cell level access;
   a fifth instruction to identify, by a machine-learning based parser, an intent of the user through the usage knowledge, wherein the machine learning-based parser comprises a recurrent neural network and a logistic regression model;
   a sixth instruction to generate an interpretation comprising period identification, business object identification, measure inference, condition identification, and intent identification, wherein the interpretation is implemented by an analytic specific meta ontology comprising a concept map, wherein the concept map is generated by automatically creating a keyword list through applying word dependency and part of speech (POS) tagging to extract domain and organization specific knowledge;
   a seventh instruction to formulate a plurality of intermediate queries based on the interpretation, wherein formulation of the intermediate queries comprises inferring a missing period through exploration and exploitation algorithms in reinforcement learning, merging business objects having common attributes, inferring measures relevant to the user based on past interactions of the user, and validating the user's authorization;
   an eighth instruction to convert each intermediate query into a database-aware structured query language query;
   a ninth instruction to identify a transaction table for each database-aware structured query language query;
   a tenth instruction to retrieve data values from the transaction table for each database-aware structured query language query;
   an eleventh instruction to convert the data values to valid display formats to form an answer corresponding to each intermediate query;
   a twelfth instruction to determine a visualization preference based on the usage knowledge;
   a thirteenth instruction to recommend follow-up or drill-down actions to aid the user in his information needs and further analysis; and
   a fourteenth instruction to aggregate and rank the answer;
   wherein the system is configured to continuously learn about the user based on interactions of the user through a user session, wherein the user session is configured to keep track of what the user is performing by monitoring interactive information interchanged between the user and the system.

2. The system of claim 1, wherein the three levels of parsers comprise a constituency parser, stop words parser, and a relaxation parser.

3. The system of claim 1, wherein the periods are identified using a SUTime temporal tagger.

4. The system of claim 1, wherein the measures are identified and ranked using a Bayesian learning and weighted context similarity approach.

5. The system of claim 1, wherein the conditions are identified through a forward-backward parsing algorithm.

6. The system of claim 1, wherein the usage knowledge based on user interactions comprises data inquiry, correction of ambiguous entities, actions on the interpretation, actions on the answer, tracking of the answer, drilling down on data, visualization changes, up-vote/down-vote on the answer, actions on a suggested analysis, and follow-up on suggested questions.

7. The system of claim 1, wherein the first subnetwork for data processing comprises at least one virtual or physical server node for executing the software modules.

8. The system of claim 1, wherein the first subnetwork for data processing comprises serverless architectures.

9. The system of claim 1, wherein the first subnetwork for data processing comprises a multi-server-node cluster for executing the software modules.

10. The system of claim 1, wherein the second subnetwork for data storage comprises a big data framework and a database system for data inquiry and retrieval.

11. A method for adaptive question answering, comprising steps of
  receiving, by an adaptive question answering system implemented by a computer network, a question in natural language from a user, wherein the computer network comprises a first subnetwork for data processing and a second subnetwork for data storage comprising usage knowledge, wherein the computer network is configured to execute software modules;
  identifying, through three levels of parsers, a plurality of entities in the question, wherein the entities comprise periods, business objects, measures and conditions;
  disambiguating lexical entities at a word level using word-sense disambiguation and entities at an entire context level of the question using rules for preposition;
  validating a user's authorization for information retrieval through a fine-grained authorization control, wherein the fine-grained authorization control comprises a row level access, a column level access and a cell level access;
  identifying, by a machine-learning based parser, an intent of the user through the usage knowledge, wherein the machine learning-based parser comprises a recurrent neural network and a logistic regression model;
  generating an interpretation comprising period identification, business object identification, measure inference, condition identification, and intent identification, wherein the interpretation is implemented by an analytic specific meta ontology comprising a concept map, wherein the concept map is generated by automatically creating a keyword list through applying word dependency and part of speech (POS) tagging to extract domain and organization specific knowledge;
  formulating a plurality of intermediate queries based on the interpretation, wherein formulation of the intermediate queries comprises inferring a missing period through exploration and exploitation algorithms in reinforcement learning, merging business objects having common attributes, inferring measures relevant to the user based on past interactions of the user, and validating the user's authorization;
  converting each intermediate query into a database-aware structured query language query;
  identifying a transaction table for each database-aware structured query language query;
  retrieving data values from the transaction table for each database-aware structured query language query;
  converting the data values to valid display formats to form an answer corresponding to each intermediate query;
  determining a visualization preference based on the usage knowledge;
  recommending follow-up or drilldown actions to aid the user in his information needs and further analysis; and
  aggregating and ranking the answer;
  wherein the system is configured to continuously learn about the user based on interactions of the user through a user session, wherein the user session is configured to keep track of what the user is performing by monitoring interactive information interchanged between the user and the system.

12. The method of claim 11, wherein the three levels of parsers comprise a constituency parser, stop words parser, and a relaxation parser.

13. The method of claim 11, wherein the periods are identified using a SUTime temporal tagger.

14. The method of claim 11, wherein the measures are identified and ranked using a Bayesian learning and weighted context similarity approach.

15. The method of claim 11, wherein the conditions are identified through a forward-backward parsing algorithm.

16. The method of claim 11, wherein the usage knowledge based on user interactions comprises data inquiry, correction of ambiguous entities, actions on the interpretation, actions on the answer, tracking of the answer, drilling down on data, visualization changes, up-vote/down-vote on the answer, actions on a suggested analysis, and follow-up on suggested questions.

17. The system of claim 11, wherein the first subnetwork for data processing comprises at least one virtual or physical server node for executing the software modules.

18. The system of claim 11, wherein the first subnetwork for data processing comprises serverless architectures.

19. The system of claim 11, wherein the first subnetwork for data processing comprises a multi-server-node cluster for executing the software modules.

20. The system of claim 11, wherein the second subnetwork for data storage comprises a big data framework and a database system for data inquiry and retrieval.

* * * * *